July 19, 1932. H. E. CAMPBELL 1,867,807
HEATING APPARATUS
Filed Aug. 2, 1930   3 Sheets-Sheet 1
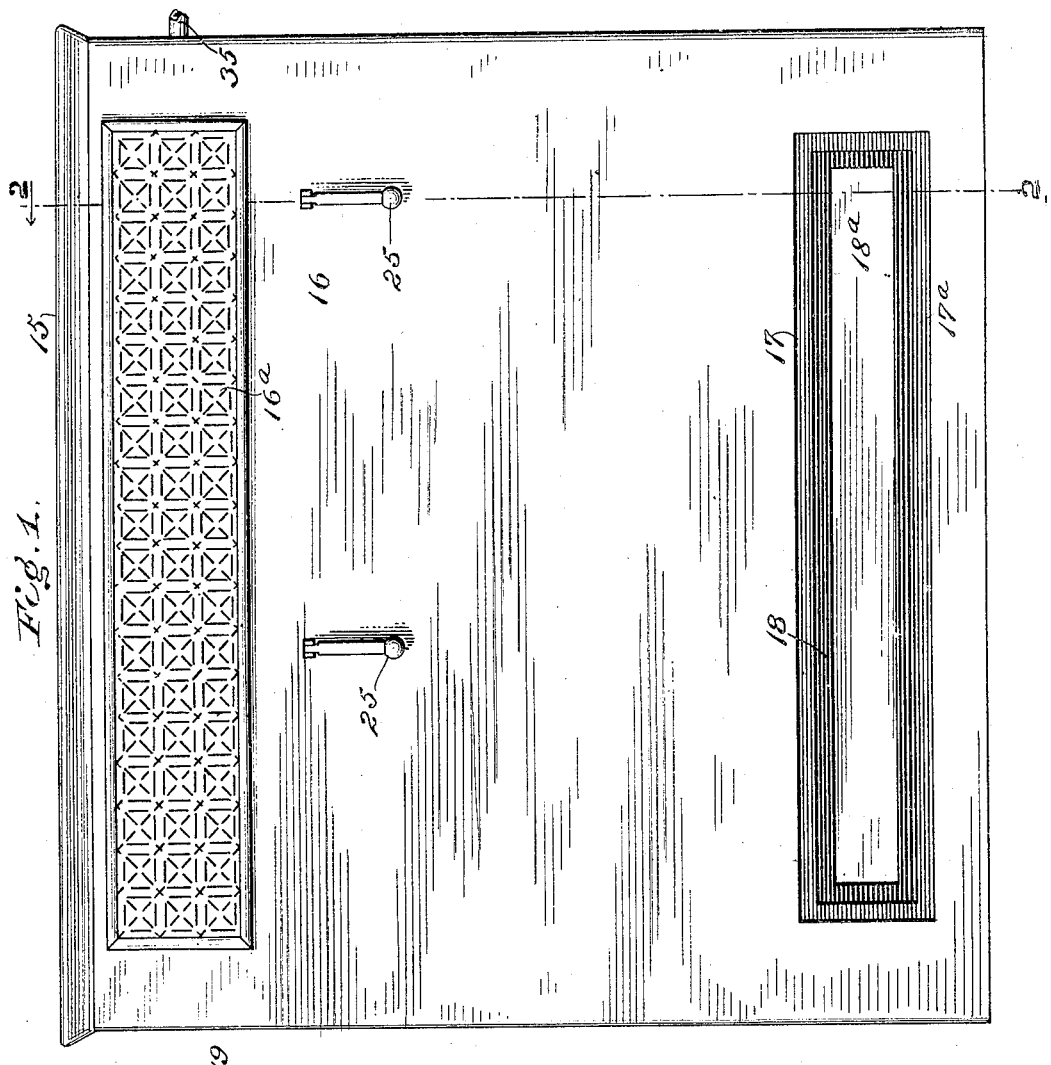
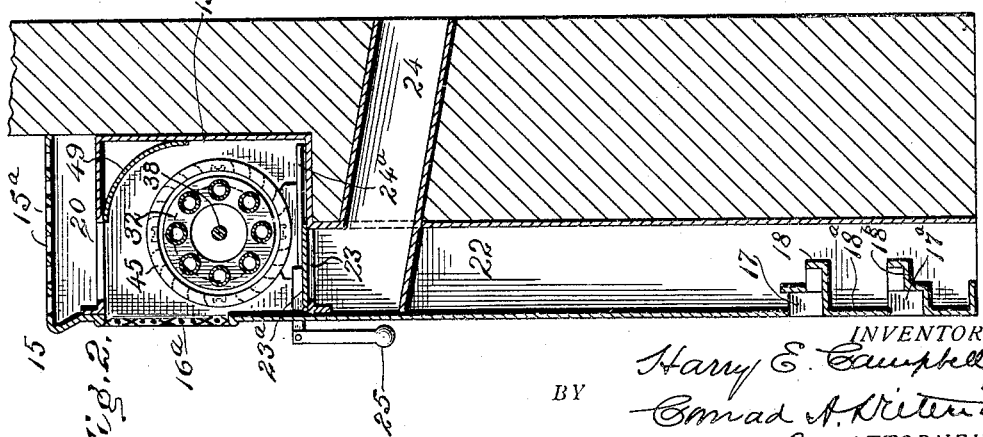
INVENTOR
Harry E. Campbell
BY Conrad A. Dieterich
his ATTORNEY July 19, 1932. H. E. CAMPBELL 1,867,807
HEATING APPARATUS
Filed Aug. 2, 1930 3 Sheets-Sheet 2
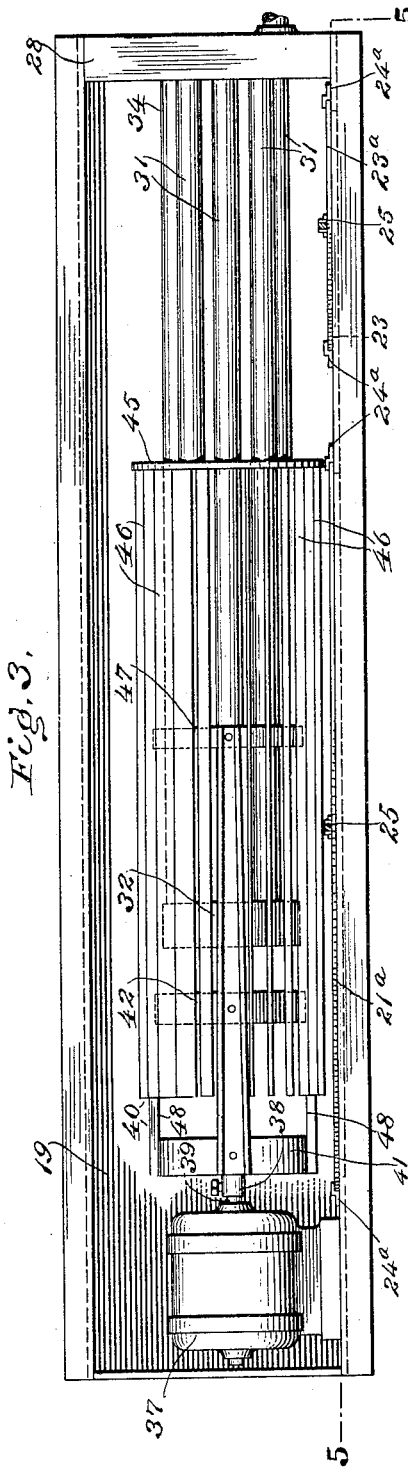
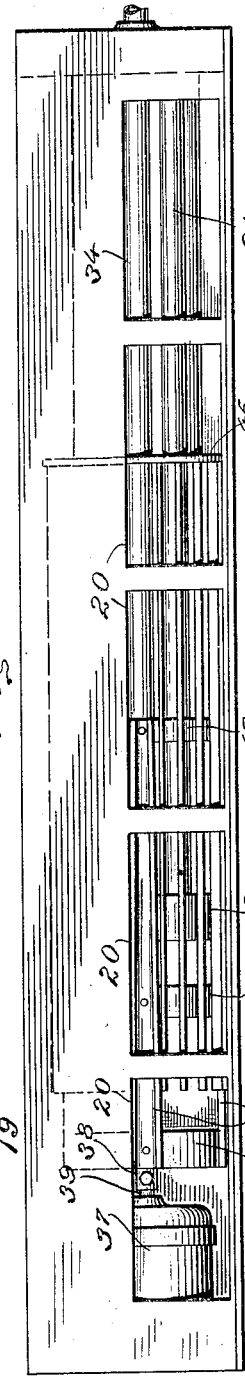
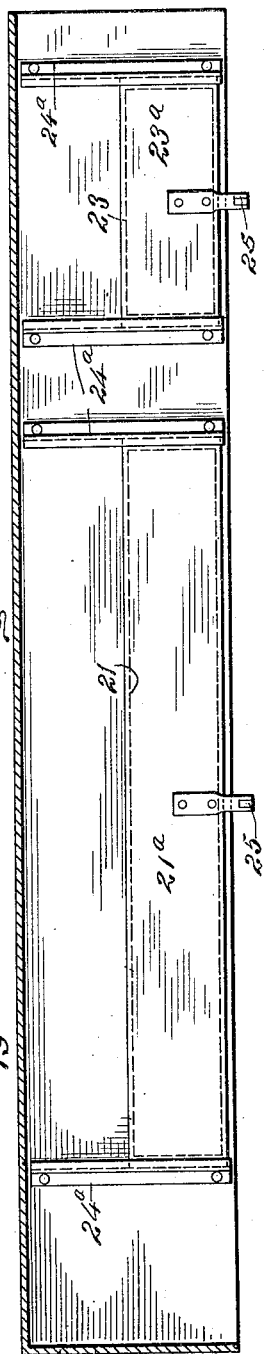
INVENTOR
Harry E. Campbell
BY Conrad A. Dieterich
his ATTORNEY July 19, 1932. H. E. CAMPBELL 1,867,807
HEATING APPARATUS
Filed Aug. 2, 1930   3 Sheets-Sheet 3
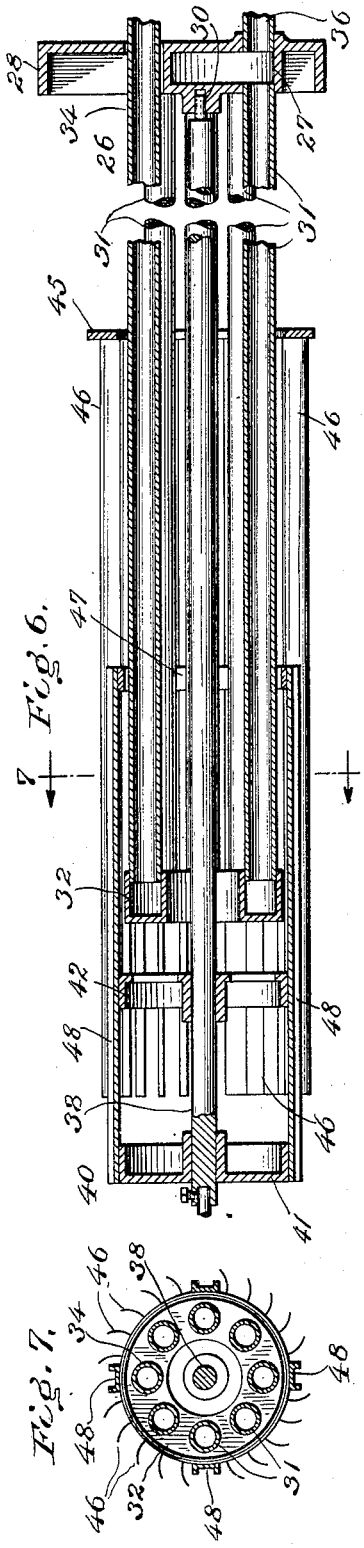
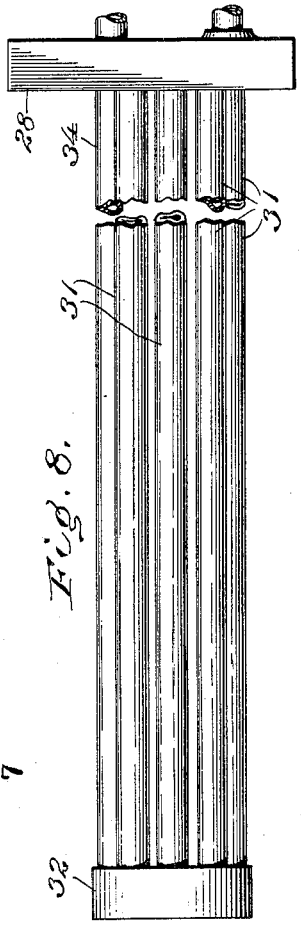
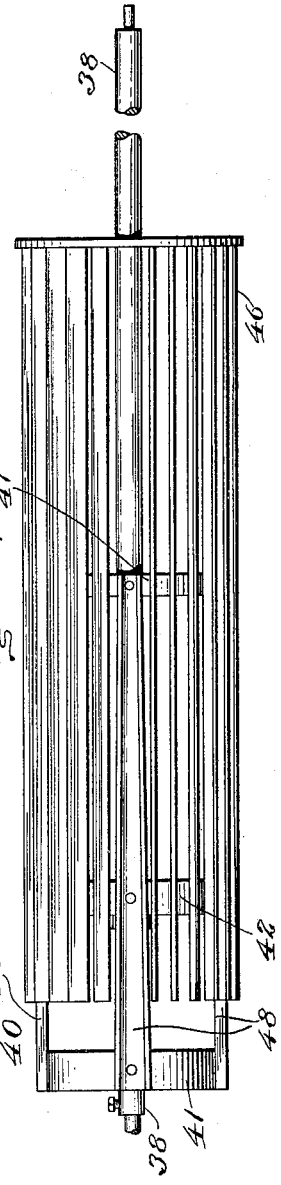
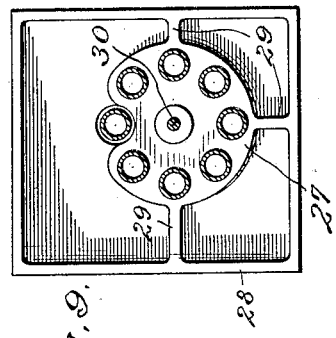
INVENTOR
Harry E. Campbell
BY Conrad A. Dieter
his ATTORNEY Patented July 19, 1932

1,867,807

UNITED STATES PATENT OFFICE

HARRY E. CAMPBELL, OF BALTIMORE, MARYLAND, ASSIGNOR TO CAMPBELL METAL WINDOW CORPORATION, OF BALTIMORE, MARYLAND, A CORPORATION OF MARYLAND

HEATING APPARATUS

Application filed August 2, 1930. Serial No. 472,733.

My invention relates to improvements in heating apparatus, and the same has for its object to provide a simple, efficient and compact heating apparatus which may be conveniently disposed within a window casing, or other suitable space.

Further, said invention has for its object to provide a heating apparatus which may be readily disposed within a window casing or other space, and the heat emitted therefrom forced into the room to be heated.

Further, said invention has for its object to provide a heat emitting apparatus comprising a heating element, and an air forcing device surrounding the heat emitting apparatus serving to force the heated air into the room to be heated.

Further, said invention has for its object to provide a heating apparatus in which a series of longitudinal tubes for circulatingly receiving a fluid heating medium, are disposed within a cylindrical fan wheel or blower whereby the air to be heated is drawn through and over said heating apparatus, and thence discharged into the room or space to be heated.

Further, said invention has for its object to provide a heating apparatus in which a series of closely associated longitudinal tubes containing the heating medium are disposed within and substantially surrounded by a rotary blower of the squirrel cage type, and in which said heating element serves partly to support said blower.

Other objects will in part be obvious and in part be pointed out hereinafter.

To the attainment of the aforesaid objects and ends, my invention consists in the novel features of construction, and in the combination, connection, and arrangement of parts hereinafter described and then pointed out in the claims.

In the accompanying drawings forming part of this specification, wherein like numerals of reference indicate like parts,—

Figure 1 is a front view of the lower portion of a window casing illustrating one embodiment of my invention;

Fig. 2 is a vertical section of the same on the line 2—2 of Fig. 1;

Fig. 3 is a detail front view of the heating apparatus and the receptacle therefor;

Fig. 4 is a top view of the parts shown in front elevation at Fig. 3;

Fig. 5 is a horizontal section on the line 5—5 of Fig. 3;

Fig. 6 is an enlarged longitudinal sectional view of the heating element and blower;

Fig. 7 is a transverse section on the line 7—7 of Fig. 6.

Fig. 8 is a side elevation of the heating element per se;

Fig. 9 is an end view of the same looking in the direction of the arrow $a$ Fig. 8, and Fig. 10 is a side elevation of the fan wheel or blower with its supporting shaft.

In said drawings 15 denotes the sill having outlet openings $15^a$ therein, and 16 the lower portion of a window casing having longitudinal air outlet openings in its front wall adjacent its upper portion covered by a grill 16, and longitudinal air intake openings 17, 17' at its lower portion formed by the strip 18, and angular portions $18^a$, and $18^b$. To the rear of the upper part of the window casing and below the sill 15 thereof is provided a rectangular, longitudinal receptacle 19 having openings 20 in its top communicating with the outlet perforations or openings $15^a$ in the sill 15, and in the grill 16. The base of the receptacle 19 is provided with a longitudinal inlet opening 21 which communicates with the open space 22 to the rear of the casing front and the intake openings 17, 17' therein, and a shorter inlet opening 23 which communicates with one end of a flue 24 whose other end extends through the wall of the building structure and opens to the outside atmosphere. The openings 21 and 23 are provided respectively with sliding covers $21^a$, $23^a$, working in guides $24^a$, and handles 25 which extend through the front wall of the window casing.

26 denotes a heat emitting element comprising a hollow, substantially circular hollow header 27 which is preferably formed integrally with a rectangular frame 28 and supporting arms 29 and secured in position within and adjacent one end of the receptacle 19. The header 27 is provided upon its inner side with a centrally-located bearing 30, and a series of threaded apertures to receive the ends of tubes 31 whose other ends are secured in the inner side of a hollow, annular header 32. The upper edge of the header 27 is provided with a recess 33 forming a saddle or bearing for the inlet pipe 34 which has its inner end connected to the annular header 32. The inlet pipe 34 is connected to a supply pipe 35 extending from a source of fluid heating medium, and adjacent the lower edge of the header 27 is secured one end of a pipe 36 for the return of heating fluid or condensation to the source of supply.

37 denotes an electric motor mounted in the receptacle 19 adjacent its other end, and 38 denotes a shaft having its other end secured to the shaft 39 of the motor 37, and its other end reduced and supported in the bearing 30 upon the inner side of the header 27.

40 denotes a fan wheel comprising a circular end frame member 41, fixed upon one end of the shaft 38, a similar intermediate frame member 42 is also fixed on said shaft 38 adjacent the frame member 41, and a flat, annular end member 45. Upon the frame member 42 and end member 45 are fixed a plurality of transversely curved longitudinal blades 46 whose inner ends together with the annular end member 45 are maintained duly in position by an intermediate annular bracing member 47 and a plurality of longitudinal stays 48 having their outer end portions secured to the end frame member 41 and the intermediate frame member 42. The inner ends of the stays 48 are secured to the annular bracing member 47 in order to maintain the inner end of the fan wheel wholly free from contact with the tubular members 31 and pipe 34 of the heating element 26.

In order to direct the heated air in part upwardly and in part forwardly the upper rear portion of the receptacle 19 is provided with a transversely-curved longitudinal deflector 49.

The operation of the apparatus will be largely obvious. It need only be noted, however, that when the air from the room, in which the apparatus is located, is to be heated and circulated, it merely becomes necessary to open the longitudinal opening 21 in the bottom of the receptacle 19, by sliding back the cover 21ª whereupon air will be drawn through the intake openings 17 adjacent the lower edge of the casing, and discharged through the outlet openings 15ª in the sill 15 and through the grill 16. If it is desired to introduce outside air into the room the opening 23 in the base of the receptacle 19 should be opened by shifting the cover 23ª, whereupon air will be drawn from without by way of the duct 24, and caused to pass over the heating element 26, and be thence forced by the fan wheel 40, actuated by the motor 37, through the outlet openings in the sill 15, and grill 16.

It will, of course, be understood that the apparatus need not be located below a window frame, but that the same may be positioned in any portion of a window casing or adjacent part, or located in any suitable recess or opening in the wall of a building structure.

Having thus described my said invention, what I claim and desire to secure by Letters Patent is:

1. An apparatus of the character described comprising a casing having an intake and outlet openings, an air forcing apparatus disposed in said casing, means for actuating said air forcing apparatus, and a heating element including a plurality of parallel longitudinal members disposed partly within and partly without said air forcing apparatus, substantially as specified.

2. An apparatus of the character described comprising a casing having an intake and outlet openings, a shaft, a revoluble blower disposed in said casing, and fixed upon one end of said shaft, means for actuating said blower, and a heating element supported within said blower but free therefrom and serving to support the other end of said shaft, substantially as specified.

3. An apparatus of the character described comprising a casing having an intake and outlet openings, a shaft, a cylindrical revoluble air forcing member, means for supporting said air forcing member upon said shaft with its ends free from said shaft, means for actuating said air forcing member, and a heating element extending into and surrounded by said air forcing member, substantially as specified.

4. An apparatus of the character described comprising a casing having air intake and outlet openings, a longitudinal revoluble blower disposed in said casing, driving means for actuating said blower, and a longitudinal heating element secured at one end within said casing and having its other end free and extending a substantial distance into said blower, substantially as specified.

5. An apparatus of the character described comprising a casing having air intake and outlet openings, a revoluble cylindrical blower disposed in said casing, driving means for actuating said blower, and a heating element including a source of longitudinal tubular members secured at one end within said casing and having its other end free and extending a substantial distance into said blower, substantially as specified.

6. The combination of a window casing having air intake and outlet openings, a revoluble cylindrical blower, disposed in said casing, driving means for actuating said blower, and a longitudinal heating element secured within said casing and having a portion extending into said blower, substantially as specified.

7. An apparatus of the character described comprising a casing having intake and outlet openings therein for the air to be heated, a cylindrical, revoluble blower in said casing, means for actuating said blower, and a longitudinal heating element including a pair of headers and a group of longitudinal tubular members secured at their ends to said headers; one of said headers being fixed to said casing and the other thereof free, and said free end extending into said blower, substantially as specified.

8. An apparatus of the character described comprising a casing having intake and outlet openings therein for the air to be heated, a cylindrical revoluble blower having an open end and disposed in said casing, a motor for actuating said blower, and a longitudinal heating element including a pair of headers and a group of longitudinal tubular members secured at their ends to said headers for circulatingly receiving a fluid heating medium; one of said headers being fixed to said casing and the other thereof free, and said free end extending into the open end of said blower, substantially as specified.

9. The combination of a window casing having intake and outlet openings therein for the air to be heated, a cylindrical, revoluble blower having an open end and disposed in said casing, a motor for actuating said blower, and a longitudinal heating element including a pair of headers and a group of longitudinal tubular members secured at their ends to said headers for circulatingly receiving a fluid heating medium; one of said headers being fixed to said casing and the other thereof free, and said free end extending a substantial distance into the open end of said blower, substantially as specified.

10. An apparatus of the character described comprising a casing having intake and outlet openings therein for the air to be heated, a longitudinal heating element including a fixed header, an annular header and a plurality of tubular members secured at their opposite ends to said headers, a motor adjacent to the free end of said heating element, a shaft having one end connected to said motor and its other end supported in said fixed heater, and a cylindrical blower fixed at one end to said shaft and surrounding the free end of said heating element, substantially as specified.

11. An apparatus of the character described comprising a casing having intake and outlet openings therein for the air to be heated, means for severally controlling said inlet openings, a longitudinal heating element including a fixed header, an annular header and a plurality of tubular members secured at their opposite ends to said headers for circulatingly receiving a fluid heating medium, a motor mounted adjacent to the free end of said heating element, a shaft having one end connected to said motor and its other end supported in said fixed header, and a cylindrical blower fixed at one end to said shaft and surrounding the free end of said heating element, substantially as specified.

12. The combination of a window casing having intake openings at its base and outlet openings at its top, a longitudinal heating element including a fixed header intermediate said inlet and outlet openings, an annular header and a plurality of tubular members secured at their opposite ends to said headers for circulatingly receiving a fluid heating medium, a motor mounted adjacent to the free end of said heating element, a shaft having one end connected to said motor and its other end supported in said fixed header, and a cylindrical blower fixed at one end to said shaft and surrounding the free end of said heating element, substantially as specified.

13. The combination of a window casing having intake and outlet openings therein, a heating element in said casing located intermediate said intake and outlet openings, said heating element including a header fixed in said casing and communicating with a source of heating fluid, an annular header and a plurality of tubular members secured at their opposite ends to said fixed and annular headers; one of said tubular members extending from said annular header communicating with the return leading to said source of heating fluid, a shaft having one end supported on said fixed header, a longitudinal blower having one end secured to the other end of said shaft and having its end free and enclosing a substantial portion of the length of said heating element, substantially as specified.

14. The combination of a window casing having intake and outlet openings therein, a heating element in said casing located intermediate said intake and outlet openings, said heating element including a header fixed in said casing and communicating with a source of heating fluid, an annular header and a plurality of tubular members secured at their opposite ends to said fixed and annular headers; one of said tubular members extending from said annular header communicating with the return leading to said source of heating fluid, a shaft having one end supported on said fixed header, a cylindrical blower, means secured to said shaft and engaging said blower intermediate of its ends for supporting said blower upon said shaft with its ends free therefrom, said blower having one of its ends free and enclosing a substantial portion of the length of said heating element, substantially as specified.

15. The combination of a window casing having intake and outlet openings therein, a heating element in said casing located intermediate said intake and outlet openings, said heating element including a frame, a header fixed in said frame and communicating with a source of heating fluid, an annular header and a plurality of tubular members secured at their opposite ends to said fixed and annular headers; one of said tubular members extending from said annular header communicating with the return leading to said source of heating fluid, a shaft having one end supported on said fixed header, a cylindrical blower and means for supporting said blower upon said shaft with both of its ends free therefrom, said blower having one of its ends free and enclosing a substantial portion of the length of said heating element, substantially as specified.

16. The combination of a window casing having intake and outlet openings therein, a heating element in said casing located intermediate said intake and outlet openings, said heating element including a header fixed in said casing and communicating with a source of heating fluid, an annular header and a plurality of tubular members secured at their opposite ends to said fixed and annular headers; one of said tubular members extending from said annular header communicating with the return leading to said source of heating fluid, a shaft having one end supported on said fixed header, a cylindrical blower, means for supporting said blower upon said shaft including a plurality of heads secured to said shaft adjacent to one end thereof, arms secured to said heads and extending parallel to said shaft, an annular member secured to the inner ends of said arms, said blower having one of its ends free enclosing a substantial portion of the length of said heating element, substantially as specified.

Signed at the city of New York, in the county of New York, State of New York, this 7th day of July, one thousand nine hundred and thirty.

HARRY E. CAMPBELL.